United States Patent Office 3,330,002
Patented July 11, 1967

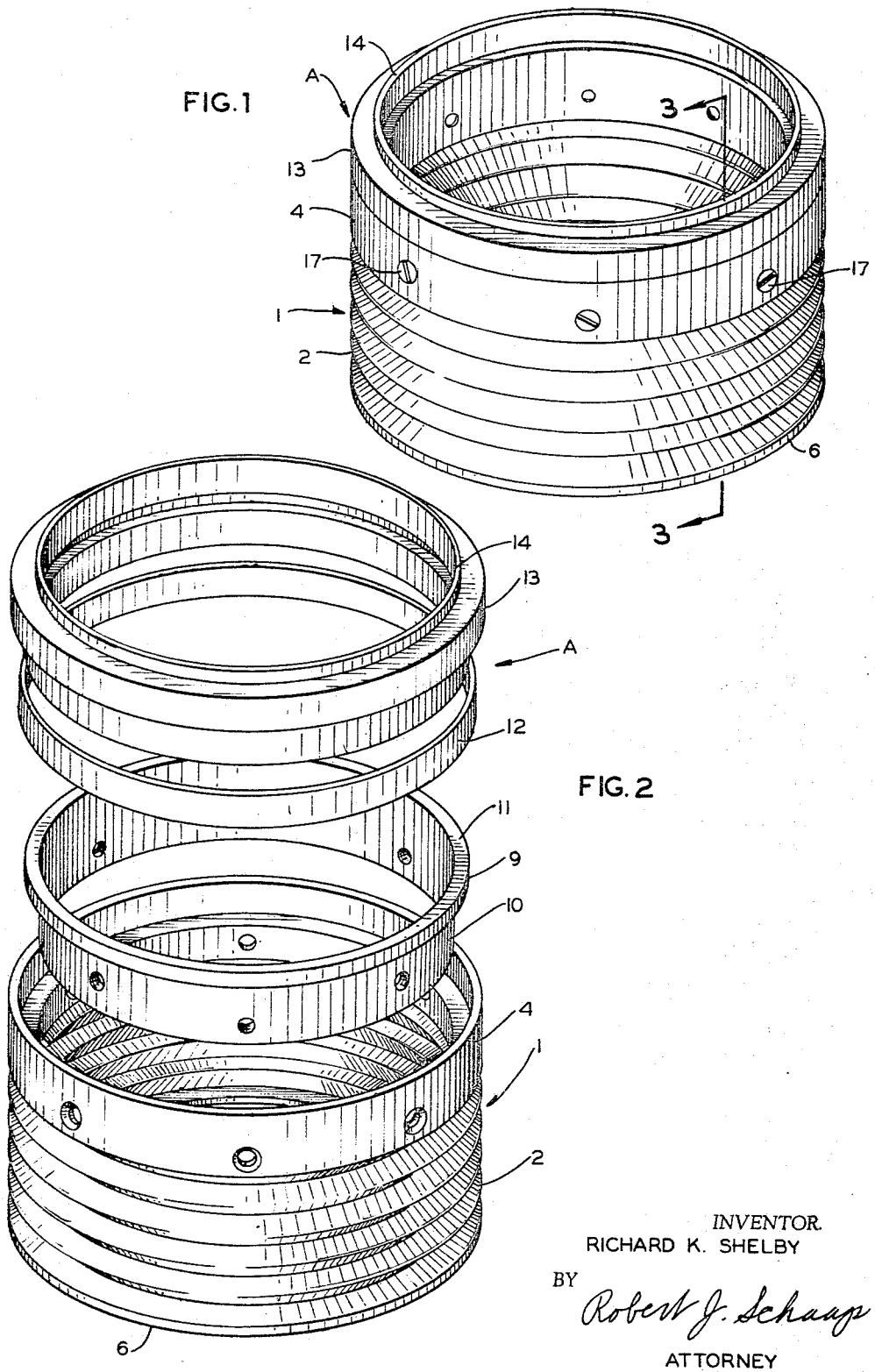

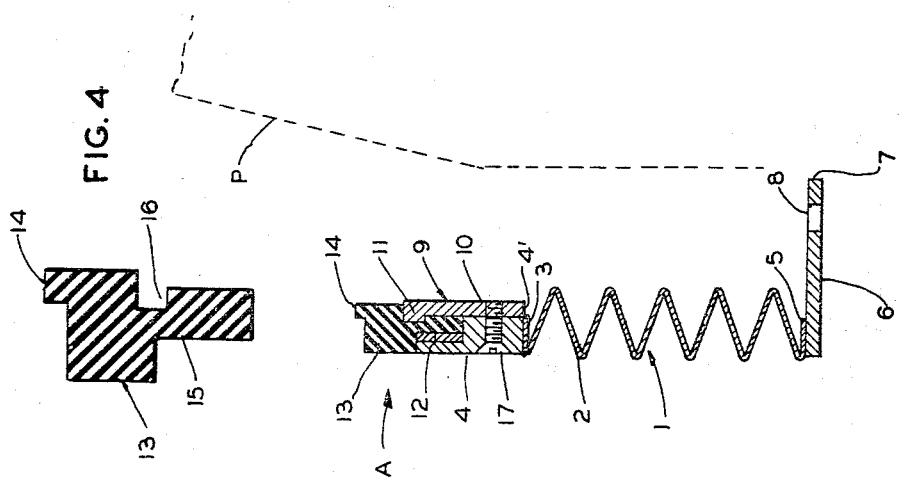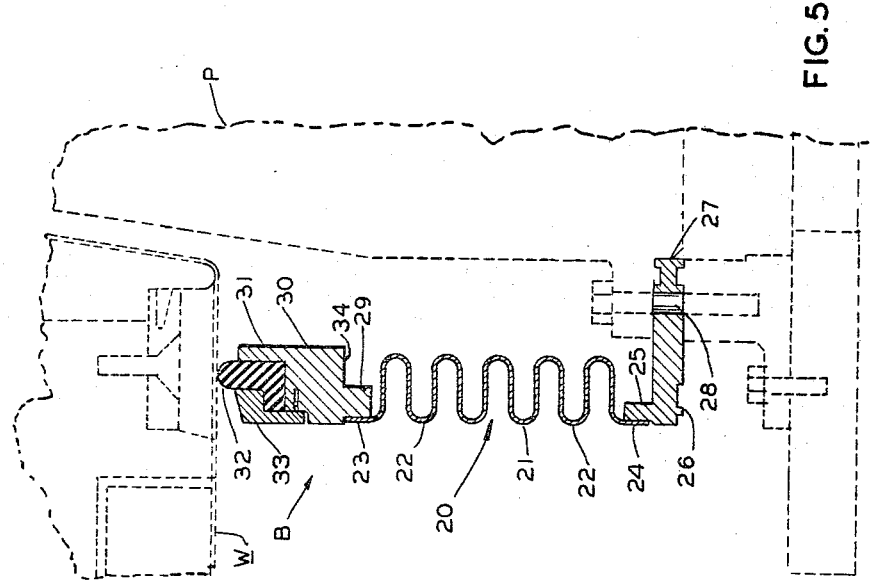

3,330,002
POSITIVE PRESSURE APPLICATOR
Richard K. Shelby, Chicago, Ill., assignor to Monsanto Company, St. Louis, Mo., a corporation of Delaware
Filed Mar. 15, 1966, Ser. No. 534,325
9 Claims. (Cl. 18—19)

This application is a continuation-in-part of my copending application Ser. No. 333,440, filed Dec. 26, 1963, now Patent No. 3,268,952.

This invention relates in general to certain new and useful improvements in an apparatus and method for forming thermoplastic articles, and more particularly, to a positive pressure forming apparatus and method employed in the molding of thermoplastic articles.

Today there have bene widespread advancements in the packaging industry with the introduction of containers formed of plastic and synthetic resinous materials. In fact, it has become a common practice to manufacture thin-walled disposable containers such as drinking cups, ice cream cups and the like from moldable, thermoplastic materials such as polystyrene and modified polystyrene. There are a large number of commercially available molding machines which are designed to form thin-walled containers from sheets of thermoplastic material. In this art of forming articles from thermoplastic materials, the injection molding and pressure molding methods have been most advantageously employed. Molding machines which employ the pressure molding method generally comprise a device for feeding a sheet of thermoplastic material, either intermittently or continuously, between cooperating dies. The dies are adapted to engage the movable web of thermoplastic material generally in a shifting movement and form the plastic material to a shape generally conforming to that of the receiving die.

The pressure or so-called vacuum molding process employs the vacuum as an assist for drawing the thermoplastic web into the die along with the mechanical engagement of the web. It has been found that the overall thickness of the walls of the article produced are more uniform when a vacuum assist is employed with the mechanical engagement of the web in causing the deformation of the web. This type of device is designed so that the side of the sheet which is formed by the male die is generally maintained at atmospheric pressure while the side of the sheet which is formed within the female die is maintained at pressures less than atmospheric pressure to provide the vacuum forming of the plastic article. Moreover, this type of operation generally eliminates undesirable flow lines which present an undesirable appearance to the finally shaped article. There have also been recent attempts to employ positive air pressure assists around the male die to obtain a greater pressure differential. However, all of such attempts, to date, have been ineffective for a number of reasons.

Devices of this latter mentioned type, namely the devices which employ the differential air pressure must necessarily include an effective sealing means between the die frames in order to achieve an adequate pressure differential. In many of these devices, the die frames may shift on a suitable carriage longitudinally with the moving web, as the web is fed continuously into the molding machine. The die frames reciprocatively shift longitudinally for a predetermined distance and are then automatically returned to their initial position. In other devices, the die frames are stationarily mounted with respect to the web and the web is intermittently halted in its operation during the actual molding. However, in each of these devices it is quite difficult to maintain adequate sealing between the thermoplastic web and the male and female die frame so that both a positive pressure and a vacuum assist may be employed on opposite sides of the web. This problem is even more considerable when the plastic web and the continuously moving die frames are operating at relatively high rates of speed.

The devices of the prior art attempted to overcome the sealing problem by employing a sealing frame which completely surrounded all of the individual dies which were located on a die frame. Thus, the pressure frame would extend around the periphery of each of the die frames and was adapted to engage the margins of the web as selected portions of the web were engaged by the cooperating individual pairs of dies. A pressurized condition was then maintained on the interior of the pressure frame. However, this method proved rather ineffective inasmuch as a rather large area of the web was exposed to the pressure conditions and hence uniform pressure was not maintained on all portions of the surface of the web. Moreover, it was very difficult to seal the entire periphery of the web and pressure leaks often developed. A more important problem arose in the shifting of the platens or die frames. Since pressure conditions were maintained on the entire platen or die frame, a tremendous force was exerted in a direction perpendicular to the surface of the platen thereby increasing the problems of sealing the individual die against the selected portion of the thermoplastic web. These problems seriously hampered positive pressure forming, and moreover, seriously reduced the forming speed of the various machines.

It is, therefore, the primary object of the present invention to provide a positive pressure applicator which is capable of being used with the plug assembly in a molding machine and adapted to provide a positive pressure seal between a web of thermoplastic material and cooperating die frames which shift into and out of contact with the thermoplastic material.

It is another object of the present invention to provide a positive pressure applicator of the type stated which is capable of being used in molding machines employing continuously moving webs of moldable material and with molding machines which intermittently halt the movement of a thermoplastic web during molding operations thereof.

It is a further object of the present invention to provide a positive pressure applicator of the type stated which is capable of rapidly achieving an air-tight seal by engagement with a web of thermoplastic material during the forming operation and rapidly breaking the air-tight seal thereafter.

It is an additional object of the present invention to provide a method of gripping a web of thermoplastic material during the shaping thereof along the working edges and applying a control thinning pressure to such edge portions.

It is also an object of the present invention to provide a positive pressure applicator and method of the type stated which may be used in high volume production capacity machines.

With the above and other objects in view, my invention resides in the novel features of form, construction, arrangement and combination of parts presently described and pointed out.

In the accompanying drawings (2 sheets):

FIGURE 1 is a perspective view of a positive pressure applicator constructed in accordance with and embodying the present invention;

FIGURE 2 is an exploded perspective view of the components forming part of the positive pressure applicator of FIGURE 1 and showing the method of assembly thereof;

FIGURE 3 is a vertical sectional view, partially broken away, and taken along line 3—3 of FIGURE 1;

FIGURE 4 is a vertical sectional view showing a portion of the gripping ring forming part of the present invention; and FIGURE 5 is a vertical sectional view, partially broken away, of a modified form of positive pressure applicator constructed in accordance with and embodying the present invention.

GENERAL DESCRIPTION

Generally speaking, the present invention is based upon a flexible pressure applicator coordinating with a moving plunger to permit the imposition of a fluid pressure such as a vacuum, air or steam pressure, against a web of thermoplastic material such as styrene or a modified polystyrene. In the usual molding process, the web of thermoplastic material is preheated and forced into a die to receive the shape of the die. Generally, a plug or plug assist or so-called male die is employed to urge the preheated portion of the thermoplastic web into the die or die cavity. The employment of fluid pressure subjected against localized areas of the thermoplastic web forces the web against the walls of the die cavity at a more uniform manner and thereby permits the formation of a plastic article having a more uniform wall thickness.

The present positive pressure applicator is generally in the form of a bellows which is hollow and designed to extend around a plug or so-called "plug assist." The plug assist extends upwardly through the bellows and is designed to engage the web of thermoplastic material and force the same into a die cavity. The upper portion of the bellows carries a gripping ring assembly which may be a unitary member or provided with special contact surfaces for special applications. The gripping ring engages the web of thermoplastic material and produces an air-tight seal so that the area enclosed by the gripping ring which includes the portion of the web engaged by the plug-assist is maintained under a pressure condition. When fluid is injected into the bellows, the bellows will expand slightly causing a longitudinal extension so that a pressure is imposed on the plug assist urging the same away from the web while a positive pressure is also urged against the web.

A modified form of bellows type positive pressure applicator is also provided for operations which use a greater pressure differential across the thermoplastic web.

DETAILED DESCRIPTION

Referring now in more detail and by reference characters to the drawings which illustrate practical embodiments of the present invention, A designates a positive pressure applicator which is adaptable for use in a molding machine of the type described in my copending application Ser. No. 333,440, filed Dec. 26, 1963, now U.S. Patent No. 3,268,952. The positive pressure applicator is designed to extend around a plug assist in a manner more fully described in said application and to maintain a pressure condition on the area enclosed by said positive pressure applicator A.

The positive pressure applicator A is more fully illustrated in FIGURES 1-4, and comprises an outer housing 1 having a convoluted side wall 2. The housing is formed of aluminum and has an overall thickness of approximately 0.016" so that the convoluted side wall 2, in effect, forms a bellows portion. In this manner, the housing 1 is capable of longitudinal expansion and contraction. At its upper end, the convoluted side wall 2 is provided with an inwardly struck flange 3 for welding to the lower margin or the underside of the supporting rim 4. The lower margin of the convoluted side wall 2 is provided with an inwardly struck annular flange 5 for welding to a bottom wall 6. The underside of the supporting rim 4 to which the flange 3 is attached forms an annular pressure shoulder 4'.

By reference to FIGURES 1 and 2, it can be seen that the entire positive pressure applicator is cylindrical in horizontal cross section. The bottom wall 6 is formed with a relatively large centrally located aperture 7 for accommodating plug assists or mandrels or so-called "male dies" P, the exterior shape of which generally conforms to the interior shape of the finally molded article. In actual practice, the bottom wall 6 is secured to the plug supporting frame or platen and is generally movable therewith. The plug assists P are of such size as to extend upwardly of the positive pressure applicator A and engage a web of thermoplastic material (not shown) during a molding operation. The bottom wall 6 is also provided with fluid passageways 8.

A retaining ring 9 is provided for operative disposition within the housing 1 and includes an annular side wall 10 and an outwardly flaring upper supporting flange 11. A spacer ring 12 is also provided for operative disposition within the housing 1, in the manner as shown in FIGURE 3 and is designed to retain a gripping ring 13. The gripping ring 13 may be either a unitary member, as shown, or may be provided with special contact surfaces for special applications. The gripping ring 13 includes an upstanding annular edge 14 which is designed to engage a web of thermoplastic material during forming operation, and an annular recess 15 on its exterior surface for accommodating the spacer ring 12. Moreover, the gripping ring 13 is provided with an annular groove 16 on its interior surface for accommodating the flange 11 of the retaining ring 9.

Thus, each of the aforementioned components can be assembled in the manner as illustrated in FIGURES 1 and 2. For this purpose, the spacer ring 12 is inserted around the recessed portion 15 of the gripping ring 13. The retaining ring 9 is next fitted within the gripping ring 13 so that the flange 11 fits snugly within the groove 16. Thereafter, the entire assembly of the three components is secured to the supporting rim 4 of the housing 1 by means of a series of metal screws 17. Thus, it can be seen that the pressure applicator A can be rapidly assembled and disassembled for changing of the gripping ring 13. This gripping ring 13 is preferably formed of a linear copolymer of vinylidine fluoride and hexafluoropropylene, more fully described in my copending application Ser. No. 333,440, filed Dec. 26, 1963, now U.S. Pat. No. 3,268,952.

Because of the convolution of the bellows portion 2 in the longitudinal direction, these bellows provide a spring action when moved upwardly by raising of the bottom wall 6 against an overhead web of heated thermoplastic material which is to be subjected to a forming operation. Such forming takes place against a female die located above the web and the male die located below the web, with the pressure applicator providing for the gripping of the thermoplastic material. The pressure applicator A also provides for the admission of air pressure to force the thermoplastic material more rapidly and precisely into the female die, which may also make use of the vacuum to aid in the forming operation.

When the gaseous pressure is applied, such as compressed air at about 60 p.s.i.g., or broadly a pressure of from 5 to 100 p.s.i.g., there is a force applied at the pressure shoulder 4', below the retaining ring 9, thus overcoming the spring rate force e.g., the force required longitudinally to extend the entire bellows. Thus, with the bellows assembly already in mechanical contact, there is added to force compressing against the outer circumference or drape of the thermoplastic web. This final longitudinal expansion of the bellows provides the sealing of the gas pressure, and also serves to thin the gripped area or drape. When the frame carrying the plug assist P reaches its uppermost position, the bellows portion may contract slightly. Thus, it can be seen that the pressure applicator A compensates for non-linearity in each of the individual cavity-plug arrangements and in effect, isolates each plug assist P as an individual molding member.

In the operation of the present system, the bellows combination is first raised up to the point of loose contact with a web of heated thermoplastic material which is in a semi-fluid state. When a gas pressure e.g., air or nitrogen is applied internally to the bellows assembly, it has been found that a controllable gripping action together with a thinning of the contact area or drape is obtained.

It is possible to provide a modified form of pressure applicator B substantially as shown in FIGURE 5, and which is similar to the previously described pressure applicator A. The positive pressure applicator B generally comprises an outer housing 20 having an annular side wall 21 with a series of spaced convolutions 22 which in effect, form a bellows. The convolutions 22 are integrally formed with upwardly and downwardly extending annular flanges 23, 24, respectively. The lower flange is welded to a matching and upstanding flange 25 integrally formed with a base plate 26. The base plate 26 is somewhat similar to the previously described bottom wall 6 and is designed to retain a male die or plug assist P in the manner as shown in FIGURE 5. For this purpose, the base plate 26 is provided with a relatively large central aperture 27, which is also designed to accommodate electrical wires introduced into the interior of the plug assist P. The base plate 26 is furthermore provided with a series of annularly spaced fluid apertures 28.

The upper annular flange 23 is welded to a downwardly struck flange 29 integrally formed on an upper supporting ring 30. The upper supporting ring 30 also includes an integrally formed upstanding retaining flange 31 for retaining an L-shaped gripping ring 32. The gripping ring is held in place on the supporting ring 30 by means of a retaining ring 33, in the manner as shown in FIGURE 5. The gripping ring 32 or so-called "seal" is formed of the same material as the gripping ring 13 in the pressure applicator A. However, the gripping ring 32 in the present embodiment may be made of a simple L-shape as compared to the rather complex shape of the gripping ring employed in the first embodiment of the invention.

By further reference to FIGURE 5, it can be seen that the upper margin of the gripping ring 32 is designed to engage a web of thermoplastic material w when the plug assist P forces the same into a female die (not shown). At this point, if air is injected into the housing 20, the air pressure will bear against a shoulder 34 formed on the underside of the supporting ring 30 and cause the bellows portion of the side wall 21 to expand thereby permitting longitudinal expansion of the entire housing 20. In effect, the bellows portions is sized with sufficient thickness so that the air pressure which is normally injected into the housing 20 is sufficient to overcome the spring rate force of the bellows portion. Thus when sufficient quantity of air has been injected into the housing 20, the air will provide a sufficient upwardly directed force on the shoulder 34 causing the housing to expand in the longitudinal direction. As this occurs, a greater gripping force will be maintained on the underside of the web w as the positive pressure increases. Furthermore, the bellows is designed to provide this extensible movement when the platens or frames on which the plugs P and the female die (not shown) are mounted begin to shift away from each other. As this occurs, positive pressure will be maintained on the web w momentarily thereafter. This type of operation, however, is more fully illustrated and described in my copending application Ser. No. 333,440, filed Dec. 26, 1963, now U.S. Patent No. 3,268,952, relating to positive pressure apparatus and is, therefore, not described in detail herein. The convoluted portion of the side wall 21 is preferably constructed of a laminated stainless steel. The laminated stainless steel is also preferably formed of two layers of Type 321 stainless steel, each having an overall thickness of 0.008" or a total thickness of 0.016". This type of structure produces longer life in the bellows portion and a closer control over the spring rate of the bellows portion. The actual overall deflection of the housing 20 normally does not exceed 0.0030".

In view of the fact that the upper pressure shoulders on each of the applicators A and B are inwardly struck with respect to the convoluted side walls, vectorial addition of forces causes an extension of each of the bellows portions, when the applicators are filled with a fluid under pressure. The applicators have been found to be highly efficient in positive pressure applications in molding operations and lends to compensation for non-linearity of operation in each cavity-plug arrangement of a molding machine.

It should be understood that changes and modifications in the form, construction, arrangement and combination of parts presently described and pointed out may be made and substituted for those herein shown without departing from the nature and principle of my invention.

Having thus described my invention, what I desire to claim and secure by Letters Patent is:

1. A pressure applicator for operative disposition around a plus forming die so that a pressure condition is maintained between said plug forming die and a thermoplastic sheet, said pressure applicator comprising a housing, extensible means operatively associated with said housing for establishing expansion and retraction thereof responsive to pressure conditions in said housing, and engageable means on one end of said housing for engaging said thermoplastic sheet, whereby an application of fluid pressure within said housing causes extensible movement thereof and causes engagement of said sheet by said engageable means.

2. The pressure applicator of claim 1 wherein the extensible means includes a bellows portion for extensible movement.

3. The pressure applicator of claim 1 wherein the engageable means is a flexible gripping member.

4. The pressure applicator of claim 1 wherein the housing is provided with a pair of opposed flat pressure bearing surfaces so that an application of fluid pressure within said housing causes a pressure force against the opposed flat surfaces thereby causing extensible movement of said housing.

5. The pressure applicator of claim 1 wherein said housing includes a side wall, the extensible means comprises a bellows portion formed in said side wall and providing extensible movement of said housing, a bottom wall operatively connected to said side wall and being operatively associated with said plug forming die so that said housing is movable with said plug forming die, and the engageable means is disposed on the upper margin of said housing for engaging said thermoplastic sheet, whereby an application of fluid pressure within said housing causes extensible movement thereof and causes engagement of said sheet by said engageable means.

6. A pressure applicator for operative disposition around a plug forming die so that a pressure condition is maintained between said plug forming die and a thermoplastic sheet, said pressure applicator comprising a base wall operatively associated with said plug forming die so that said applicator is movable therewith, a convoluted bellows portion operatively connected to said base wall and providing extensible movement to said applicator, an upper side wall operatively connected to said bellows portion and having an annular groove, a flexible gripping member removably disposed in said annular groove and extending upwardly from the upper margin of said side wall, and a retaining ring operatively disposed around a portion of said gripping member for holding the same to said side wall, whereby an application of fluid pressure within said applicator causes extensible movement thereof and causes engagement of said sheet by said gripping member.

7. The pressure applicator of claim 6 wherein the side wall and the base wall provide a pair of annular opposed flat pressure bearing surfaces so that an application of fluid pressure within said applicator causes a pressure force against the opposed flat surfaces thereby causing extensible movement of said applicator.

8. The pressure applicator of claim 6 wherein the base wall is provided with an upwardly struck annular flange and the side wall is provided with a downwardly struck annular flange and said convoluted bellows portion is secured directly to said flanges.

9. The pressure applicator of claim 6 wherein said convoluted bellows portion is provided with horizontally disposed annular flanges at its upper and lower margins and is securely directly to said side wall and base wall through said flanges.

References Cited

UNITED STATES PATENTS

| | | | |
|---|---|---|---|
| 3,121,916 | 2/1964 | Edwards | 18—19 |
| 3,161,915 | 12/1964 | Thiel | 18—19 |
| 3,258,813 | 7/1966 | Groth et al. | 18—19 |
| 3,259,942 | 7/1966 | Politis | 18—19 |

WILLIAM J. STEPHENSON, *Primary Examiner.*